(No Model.)

J. M. BULKLEY.
PAIL OR BARREL COVER.

No. 361,575. Patented Apr. 19, 1887.

Witnesses:
B. C. Fenwick
R. S. Fenwick

Inventor:
John M. Bulkley
by his atty
Mason, Fenwick and Lawrence

UNITED STATES PATENT OFFICE.

JOHN M. BULKLEY, OF MONROE, MICHIGAN.

PAIL OR BARREL COVER.

SPECIFICATION forming part of Letters Patent No. 361,575, dated April 19, 1887.

Application filed January 11, 1887. Serial No. 224,086. (No model.)

*To all whom it may concern:*

Be it known that I, JOHN M. BULKLEY, a citizen of the United States, residing at Monroe, in the county of Monroe and State of Michigan, have invented certain new and useful Improvements in Packing-Pails and other Vessels; and I do hereby declare the following to be a full, clear, and exact description of the invention, such as will enable others skilled in the art to which it appertains to make and use the same.

Figure 1:
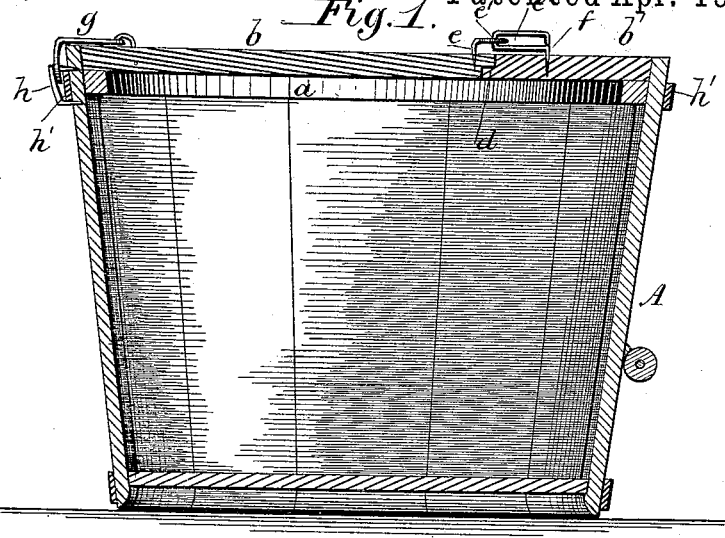
Figure 4:
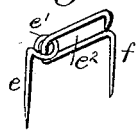
Figure 6:
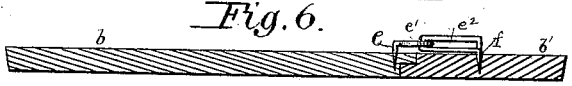
Figure 5:
Figure 2:
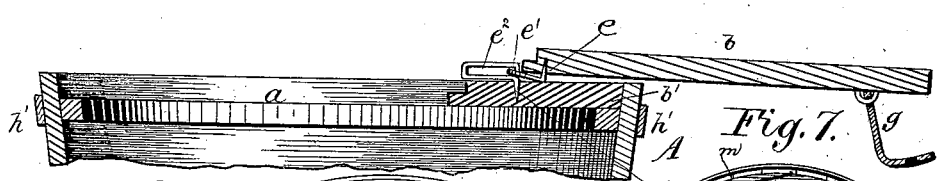
Figure 7:
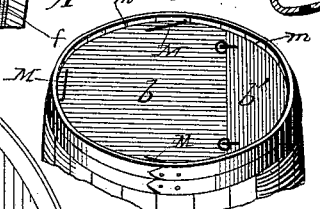
Figure 3:
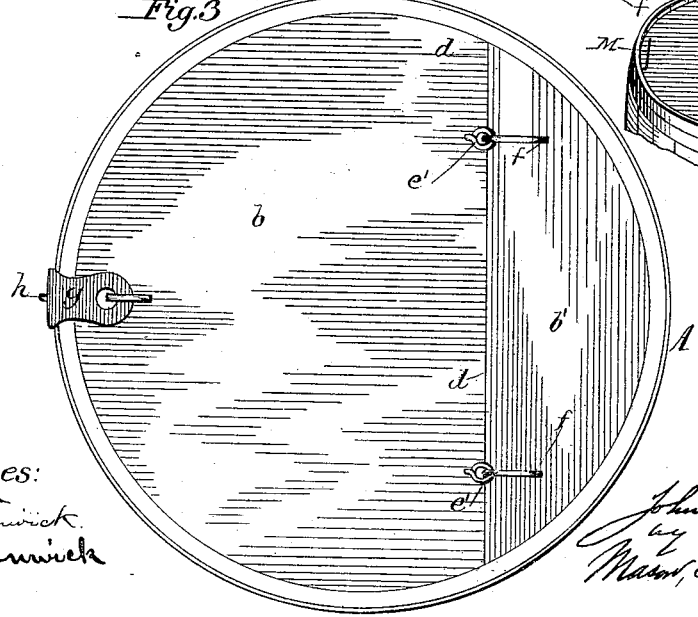

In the accompanying drawings, Figure 1 is a vertical sectional view showing my improved commercial pail for packing butter, lard, &c., with its lid closed. Fig. 2 is a like view showing the lid thrown open, but with the lower portion of the pail broken away. Fig. 3 is a plan view of my improved pail. Fig. 4 is a perspective detached view of the slide-hinge of the cover of the pail. Fig. 5 is a perspective view of the hasp employed for fastening down the lid ready for transportation. Fig. 6 is a sectional view showing the lid proper and the fixed portion of the cover of the pail to which the lid proper is attached, and Fig. 7 is a modification of my invention.

The object of my invention is to furnish for commercial use a pail in which to pack either butter or lard, and for which purpose and analogous uses a pail as ordinarily constructed may be employed, having my improvement added thereto, which improvement will but slightly enhance the cost of construction, and serve to supply not only a permanent cover to the pail, but one which, when raised to gain access to its contents, will prevent dirt from falling off the cover into the pail.

In Fig. 1 I have shown an ordinary pail, A, having my improvements added thereto, thus converting the common pail as now usually manufactured into a closed vessel fit for packing either butter, lard, or oleomargarine, as well as other substances—such, for example, as fine-cut tobacco—which it is often desirable to transport in bulk, and thus preserve its moisture and freshness, or any other substances which may be packed and transported in moderately small bulk or packages, and required to be kept clean, the vessel in which the same are packed serving to preserve them not only during transportation, but also while being taken therefrom from day to day until consumed. The vessel, when emptied, serves for repacking, if desired.

In the drawings, within the wall of the ordinary pail, A, I secure in any suitable manner a square or flat-sided hoop, $a$, sufficiently below the top edge of the pail, as shown, to leave room for a cover, $b\ b'$, to be inserted and rest down upon the hoop, as shown in Fig. 1. This cover is made in two parts, the larger part, $b$, being movable and constituting the lid, while the smaller part, $b'$, is secured permanently in place upon the hoop $a$, the two parts where they adjoin being made so as to form a close-fitting rabbet-joint, as $d$, when the lid is closed, and thus exclude dirt. These parts $b\ b'$, forming the cover of the vessel or pail A, are hinged together by a slide-hinge constructed as shown in Fig. 4, one portion or limb, $e$, of the hinge being made at its hinging-connection simply with an eye, as $e'$, while its fellow part or limb, $f$, is made with a longitudinal slot, $e^2$, as shown.

When the lid $b$ is raised, the eye portion $e'$ may slide rearwardly along in the slot $e^2$ of the hinge. This passes the rear edge of the lid $b$ above the surface of the fixed portion $b'$, and so discharges any dirt which may have casually lodged upon the lid $b$ upon the fixed portion $b'$ of the cover instead of through the joint $d$, which becomes opened on raising said lid.

As shown clearly in Fig. 5, for securing the cover in closed position, I provide a flat metal hasp, $g$, which at one end is suitably fastened to the lid $b$, as shown in Fig. 1, and at its other end receives a fastening-staple, $h$, which is made to embrace the upper hoop, $h'$, of the pail, and so prevent the upper hoop from becoming loose in transportation. In this manner I convert the common pail into a closed vessel suitable for transporting any article which requires to be packed in closed vessels for transportation, as well as to preserve them therein while being kept for daily use. It will be seen that in the same manner in which I have shown my invention as applied to a common pail the same may be applied to ordinary tubs and barrels, and so furnish a permanent cover thereto, when the occasion for transporting substances therein no longer exists.

In Fig. 7 I have shown my invention applied to a barrel, and in this case the hoop $a$ (shown in Figs. 1 and 2, but not shown in Fig. 7) is fastened on the inside of the barrel low enough down to permit the top surface of the parts $b$ $b'$, constituting the cover, to be set just at the lower termination of the chine $m$ and flush with the upper edge of the croze, as illustrated. This having been done, I then provide the lid $b$ with fastenings, one of which, as at M, is shown in detached view in Fig. 7. This view shows one of the fastenings as it will appear after it has been used—that is to say, before using it its limb $m'$ is straight, but after having been driven through the lid $b$ its end $m^2$ is bent at right angles with $m'$, and thus the fastening is held to the lid $b$. At the same time its upper limb, $m^3$, may be moved horizontally with $m'$ as an axis of motion, in order to drive the hooked portion $m^4$ into the chine $m$ of the barrel, and so fasten the lid $b$ in its closed position. This is shown in the view Fig. 7, where the barrel is shown to be used for transporting its contents. As the hooked portion $m^4$ is barbed to resist its withdrawal after having been driven into the chine $m$, the lid $b$ will thus be very securely held closed.

What I claim as new, and desire to secure by Letters Patent, is—

1. The new article of manufacture—to wit, a packing pail or vessel which comprises in its construction an interior hoop, $a$, a two-part cover seated upon said hoop having a fixed part, $b'$, and a movable part, $b$, hinged together by slide-hinges, as $e'$ $e^2$, and jointed together by a rabbet-joint, $d$, substantially as and for the purpose described.

2. A packing pail or vessel which comprises in its construction a two-part cover, $b'$ $b$, united by slide-hinges $e'$ $e^2$ and having a rabbet-joint, $d$, at their abutting edges, and provided with fastenings M, for the movable part of said cover, substantially as and for the purpose described.

In testimony whereof I affix my signature in presence of two witnesses.

JOHN M. BULKLEY.

Witnesses:
   J. R. RAUCH,
   G. B. McCALLUM.